E. W. JOY.
CULTIVATOR.

No. 182,449.  
Patented Sept. 19, 1876.

WITNESSES:  
H. Rydquist.  
John Goethals

INVENTOR:  
E. W. Joy  
BY  
ATTORNEYS.

UNITED STATES PATENT OFFICE.

EDWIN W. JOY, OF IOWA CITY, IOWA, ASSIGNOR TO HIMSELF, MARCUS F. DUNLAP, AND SAMUEL J. FAUST, OF SAME PLACE.

IMPROVEMENT IN CULTIVATORS.

Specification forming part of Letters Patent No. 182,449, dated September 19, 1876; application filed July 1, 1876.

*To all whom it may concern:*

Be it known that I, EDWIN W. JOY, of Iowa city, in the county of Johnson and State of Iowa, have invented a new and Improved Tongueless Cultivator Attachment, of which the following is a specification:

This invention relates to cultivators in which short independent axles are hinged to a yoke connecting the two axles, to allow horizontal oscillation of wheels relatively to the beams, and which are used without a tongue; and it consists of the application of another yoke in a manner to regulate the oscillation of the wheels and prevent them from cramping too much and binding against the beams, as they do in common arrangement.

Figure 1:
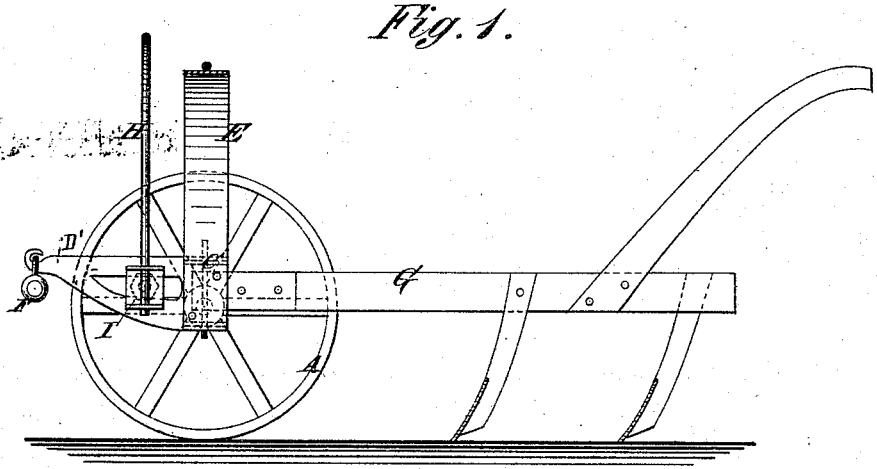
Figure 2:
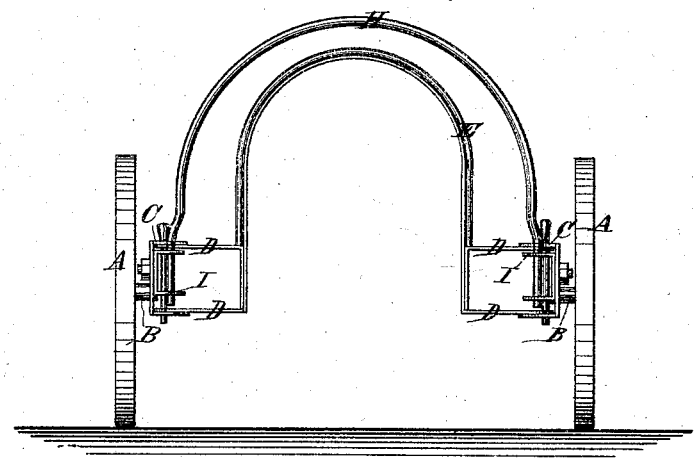

Figure 1 is a longitudinal sectional elevation of my improved machine, and Fig. 2 is a front elevation.

Similar letters of reference indicate corresponding parts.

A represents the wheels, which are mounted on the short independent axles B that are hinged to the heads D of the yoke E at C, to allow them to swing horizontally relatively to the beams F, which are attached to the heads D.

The whiffletrees are attached to the draft-bars D', which extend forward from the axles suitably for that purpose, and the draft is thus applied without a tongue for regulating the lateral vibration of the wheels, thus leaving them so free that in some cases they swing around across the front of the beams to such extent as to cramp and obstruct the machine, and they also swing back against the beams and cramp so as to interfere with working properly, which, to prevent, I propose to combine another yoke, H, with the yoke E, and the draw-bars D', as shown, so that although the wheels are still free to vibrate they are so coupled that they work in unison, so as to check each other, and have the whole of the draft acting on them to prevent too much vibration, and thus make the machine work much better than as before constructed.

In this example the yoke H is represented as mounted in the adjusting-pieces I, attached to the draft-bars D'; but it may be connected in any other approved way, and the connecting-pieces may be cast upon the bars G, if preferred.

Having thus described my invention, I claim as new and desire to secure by Letters Patent—

The combination of yoke H with the draft-bars D, and with the wheels A, working on independent axles B, hinged to yoke E, substantially as specified.

EDWIN W. JOY.

Witnesses:
CHAS. BAKER,
JOSEPH INGALLS.